United States Patent [19]

Tuch et al.

[11] Patent Number: 5,220,564
[45] Date of Patent: Jun. 15, 1993

[54] TRANSMISSION CONTROL FOR A WIRELESS LOCAL AREA NETWORK STATION

[75] Inventors: Bruce T. Tuch, De Bilt; Hans van Driest, Bilthoven, both of Netherlands

[73] Assignee: NCR Corporation, Dayton, Ohio

[21] Appl. No.: 633,699

[22] Filed: Dec. 24, 1990

[30] Foreign Application Priority Data

Sep. 6, 1990 [GB] United Kingdom ............... 9019490

[51] Int. Cl.[5] .............................. H04J 3/24
[52] U.S. Cl. ................... 370/94.1; 375/76; 455/88
[58] Field of Search ......... 455/33, 52, 54, 56, 455/58, 69, 88; 375/76; 370/94.1; 340/539, 571

[56] References Cited

U.S. PATENT DOCUMENTS 2,964,908  1/1961  Gray et al. ..................... 455/69
4,593,273  6/1986  Narcisse ........................ 455/69
4,613,990  9/1986  Halpern ........................ 455/69
4,797,948  1/1989  Hilliorn et al. ................ 455/54

Primary Examiner—Curtis Kuntz
Assistant Examiner—T. Ghebretinsae
Attorney, Agent, or Firm—Elmer Wargo

[57] ABSTRACT

In a local area network station (12) for a wireless LAN, a threshold level circuit (62) includes a register (134) which stores a threshold value. The station receiver (42) monitors the transmission channel and provides a receive level signal indicative of the signal level received. Transmission of a data frame by the station transmitter (46) is permitted or deferred according as the receive level signal value is below or above the threshold level, regardless of whether or not the received signal derives from a transmission by a station in the receiving station's own LAN. The threshold is dynamically updated whenever the station (12) receives a data frame from its own LAN. An improved utilization of the wireless transmission channel is achieved.

11 Claims, 9 Drawing Sheets

TRANSMISSION CONTROL FOR A WIRELESS LOCAL AREA NETWORK STATION

BACKGROUND OF THE INVENTION

This invention relates to local area networks (LANs) in general and to a transmission control for a wireless LAN station.

Local area networks wherein a plurality of network stations are interconnected by cabling have become widely known and utilized. However, LANs using wired connections have the disadvantage that extensive cabling is required to interconnect the stations. The provision of such cabling is generally inconvenient, and gives rise to inflexibility if it is desired to alter the physical location of the stations. It has been proposed to utilize a wireless radio link for LANs. However, certain problems are associated with the use of a radio transmission link, particularly for LANs in an indoor environment. One such problem is multipath fading. The use of spread spectrum communication techniques alleviates the problems associated with multipath fading.

Another problem associated with wireless radio LANs is that they utilize radio frequency transmission bands which are a scarce resource. In order to economize with this resource, it is desirable for stations to utilize the same frequency band. However, this gives rise to difficulties where stations of more than one LAN are situated so close together that stations of one LAN can receive stations of another LAN. It will be appreciated that this interference arising from stations of another LAN adversely affects LAN throughput performance.

SUMMARY OF THE INVENTION

It is an object of the present invention to provide a local area network station which enables a high throughput LAN performance.

Therefore, according to the present invention there is provided a local area network station for receiving signals on a wireless radio transmission channel comprising:

a receiver means for receiving signals;

a transmitter means for transmitting signals;

said receiver means comprising:

receive level determination means to provide a receive signal level representing a signal level received over said transmission channel;

threshold level circuit means to provide a level indicator signal in dependence upon a relative value of said receive signal level (RL) and a threshold level value; and transmitter control means to control the operation of said transmitter means in dependence upon said level indicator signal.

This invention also relates to a method of operating a local area network station on a wireless transmission channel, wherein said station includes receiver means and transmitter means, including the steps of:

(a) determining a receive signal level representing the signal level received by said receiver means over said transmission channel;

(b) determining the relative value of said receive signal level and threshold level; and (c) controlling the operation of said transmitter means in dependence on said relative value.

Preferably, the threshold level value mentioned above is dynamically adjustable.

A preferred embodiment of the invention will now be described by way of example, with reference to the following description, claims, and drawing.

DETAILED DESCRIPTION OF THE INVENTION

Figure 1:
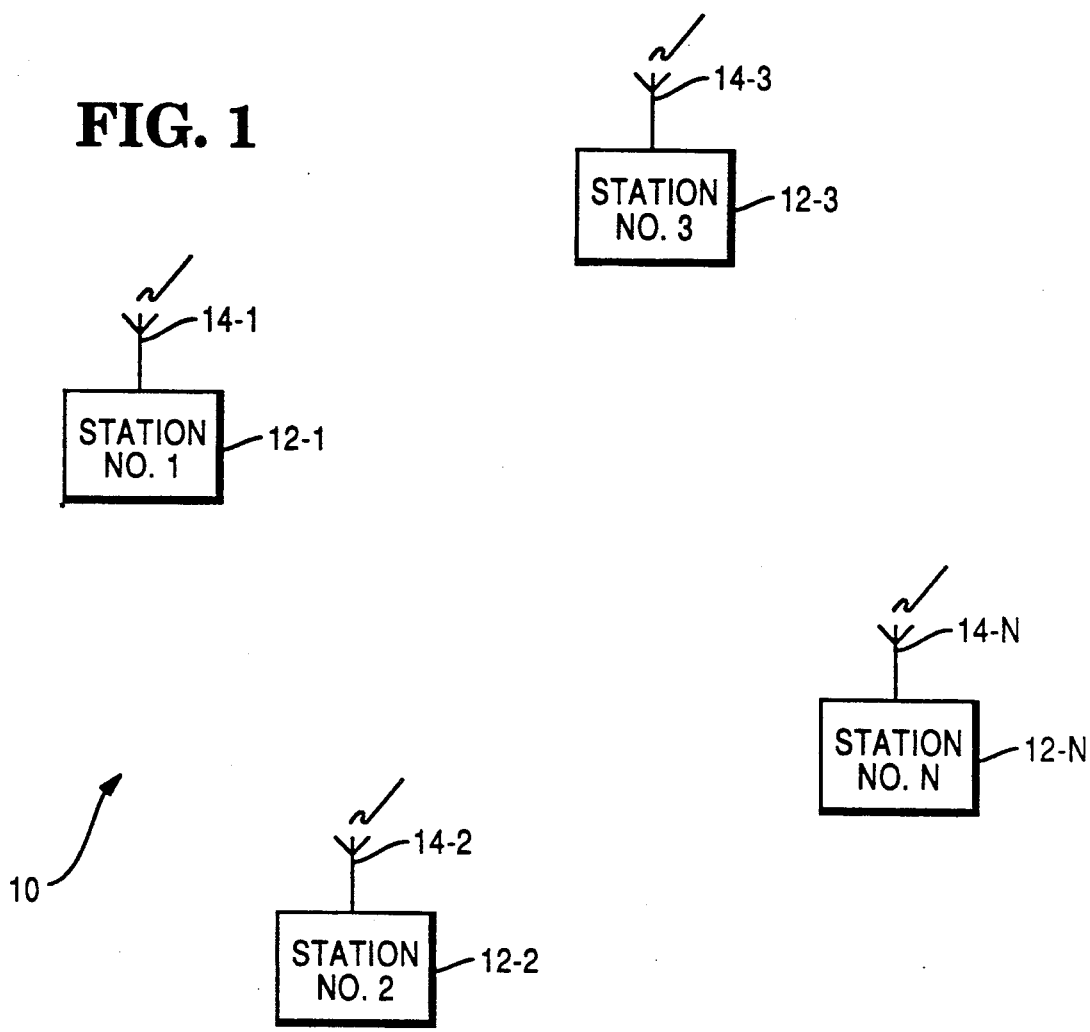
FIG. 1 is a diagram of a radio LAN.

Referring first to FIG. 1, there is shown a radio local area network (radio LAN) 10 including a plurality N of stations 12, shown individually as 12-1 to 12-N. Although only a single antenna is shown for each station 12, it will be understood that each station may have two alternatively operable antennas to provide a diversity feature for alleviating multipath fading which may arise in some environments.

Communication among the stations 12 takes place over a radio link, on a single radio channel using a carrier sense multiple access (CSMA) type protocol, and preferably uses spread spectrum communication technology.

It should first be understood that a situation is considered where a plurality of local area networks, such as the network 10, are disposed such that at least one station of one network is capable of receiving transmissions transmitted by at least one station of a different network, even though such received transmissions are not intended for the station which receives them. It is assumed that all the networks use the same radio channel, with a view to economizing in frequency spectrum utilization.

Figure 2:
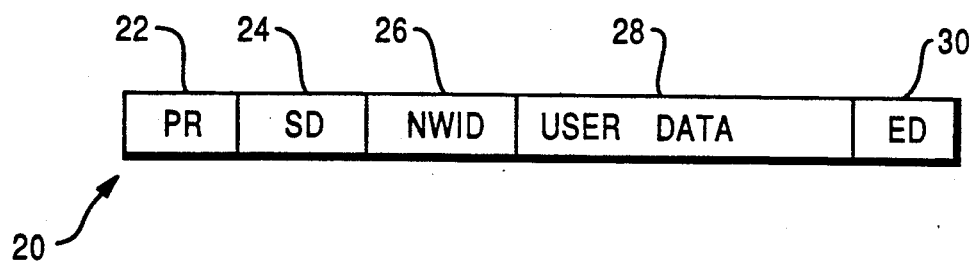
FIG. 2 shows a typical data frame utilized for transmission between stations of the radio LAN show in FIG. 1.

Referring to FIG. 2, there is shown a diagram of a typical data frame 20 transmitted in the LAN 10. The data frame 20 includes a preamble (PR) portion 22 which allows the station receivers to adjust their parameters such as gain to the best values, a start delimiter portion (SD) 24, a network identification portion (NWID) 26 which identifies the particular network 10 in which the data frame 20 is transmitted, a user data portion 28 containing the transmitted data, including source and destination station addresses, and an end delimiter portion (ED) 30.

Figure 3:
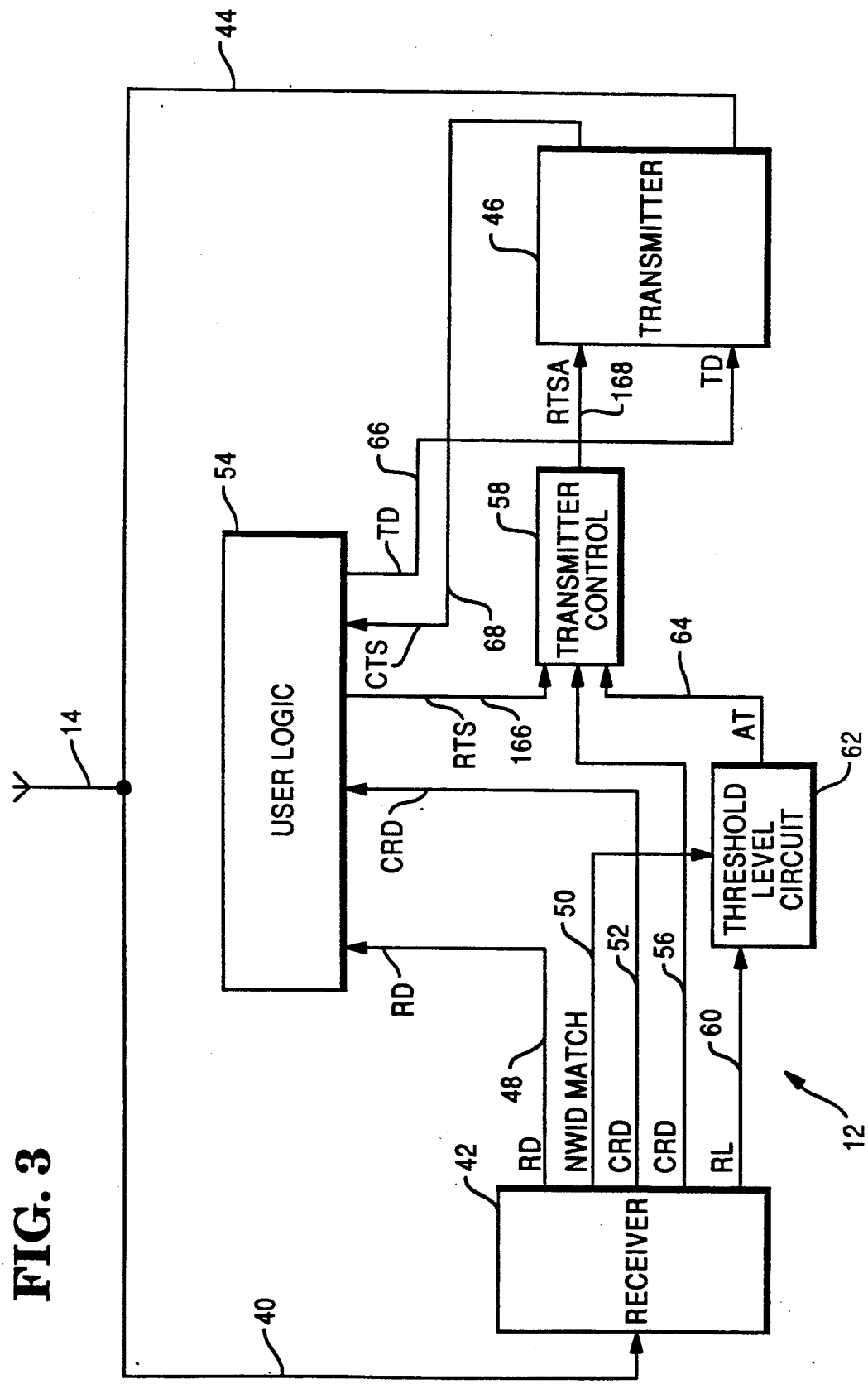
FIG. 3 is a block diagram of one of the LAN stations shown in the LAN of FIG. 1.

Referring now to FIG. 3, there is shown a block diagram of the components of a typical LAN station 12. The antenna 14 is connected over a line 40 to a receiver 42 and is also connected over a line 44 to a transmitter 46. The receiver 42 is connected over a received data (RD) line 48 and a control signal line 52 to a user logic circuit 54. The receiver 42 is also connected over a line 56 to a transmitter control circuit 58, to be described, and over a line 60 to a threshold level circuit 62, to be described. The threshold level circuit 62 also has an input connected to a line 50, and provides an output over a line 64 connected to the transmitter control circuit 58. The user logic circuit 54 provides a control signal RTS on a line 166 to the transmitter control circuit 58, which in turn, provides a control signal RTSA on a line 168 to the transmitter 46. The transmitter 46 receives data to be transmitted (TD) over a line 66 from the user logic circuit 54 and provides a control signal (CTS) on a line 68 to the user logic circuit 54.

Figure 4:
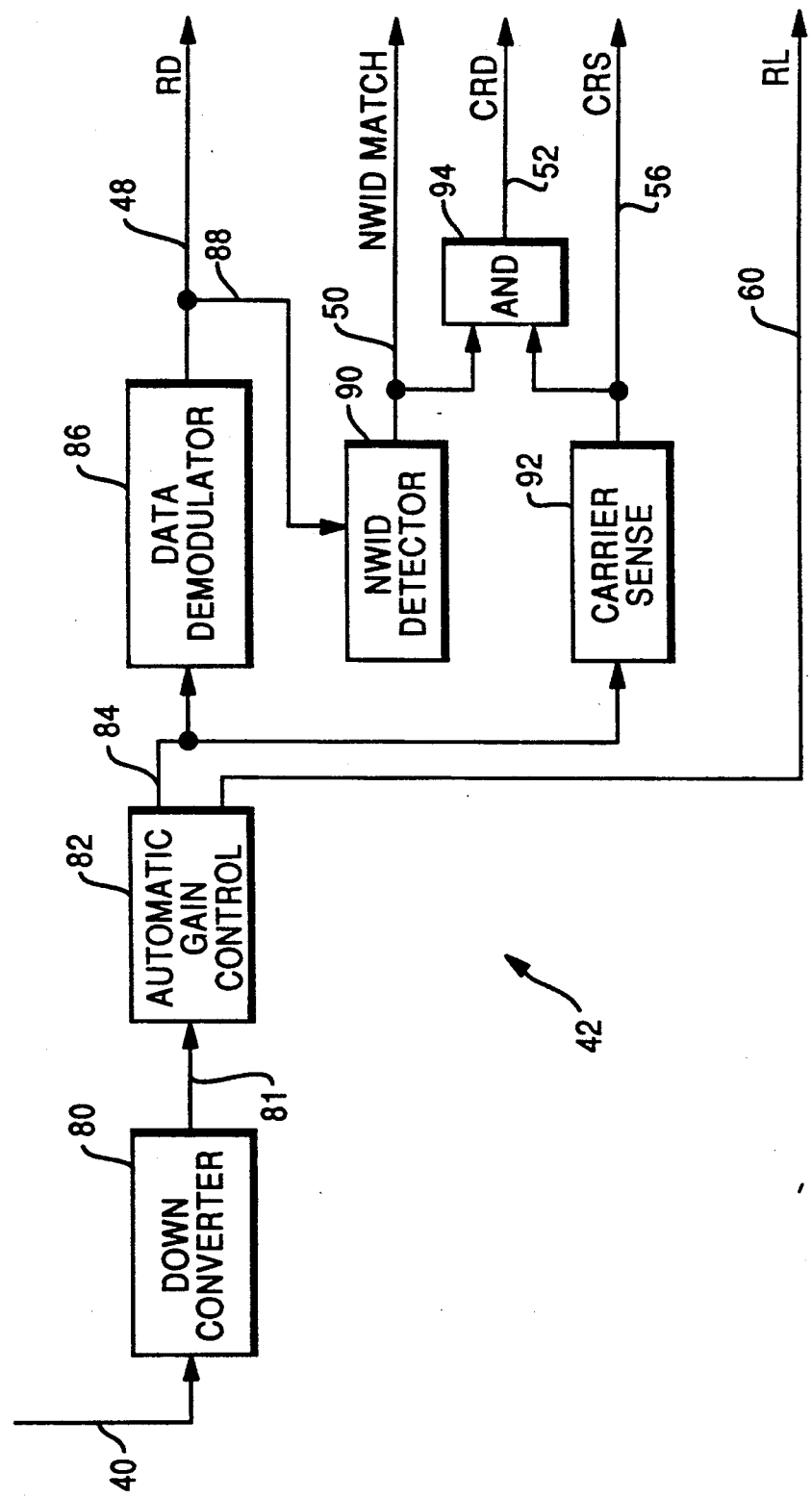
FIG. 4 is a block diagram of a receiver included in the LAN station shown in FIG. 3.

Referring now to FIG. 4, there is shown a block diagram of the receiver 42. The RF signal from the antenna 14 (FIG. 3), provided on the line 40 is converted down to a baseband in a down converter circuit 80 having an output connected over a line 81 to an automatic gain control circuit (AGC) 82. The baseband signal from the down converter circuit 80 is normalized in the AGC circuit 82, in a manner to be described. The normalized baseband signal on an output line 84 of the AGC circuit 82 is applied to a data demodulator circuit 86 which demodulates the data to provide a received data (RD) signal on the output line 48. The data demodulator circuit 86 is a conventional data demodulator circuit and the output thereof is also connected via a line 88 to a NWID detection circuit 90, which provides an NWID match signal if the NWID in the received data frame (FIG. 2) matches the NWID of the LAN 10 and station 12.

The output line 84 of the AGC circuit 82 is also connected to a carrier sense circuit 92 which provides a carrier sense signal (CRS) on the line 56 if a carrier is sensed. An AND gate 94 connected to the outputs of the NWID detector circuit 90 and the carrier detector circuit 92 provides a carrier detect signal (CRD) on the line 52. A further output of the AGC circuit 82 provides a receive level signal (RL) and is coupled to the line 60.

Figure 5:
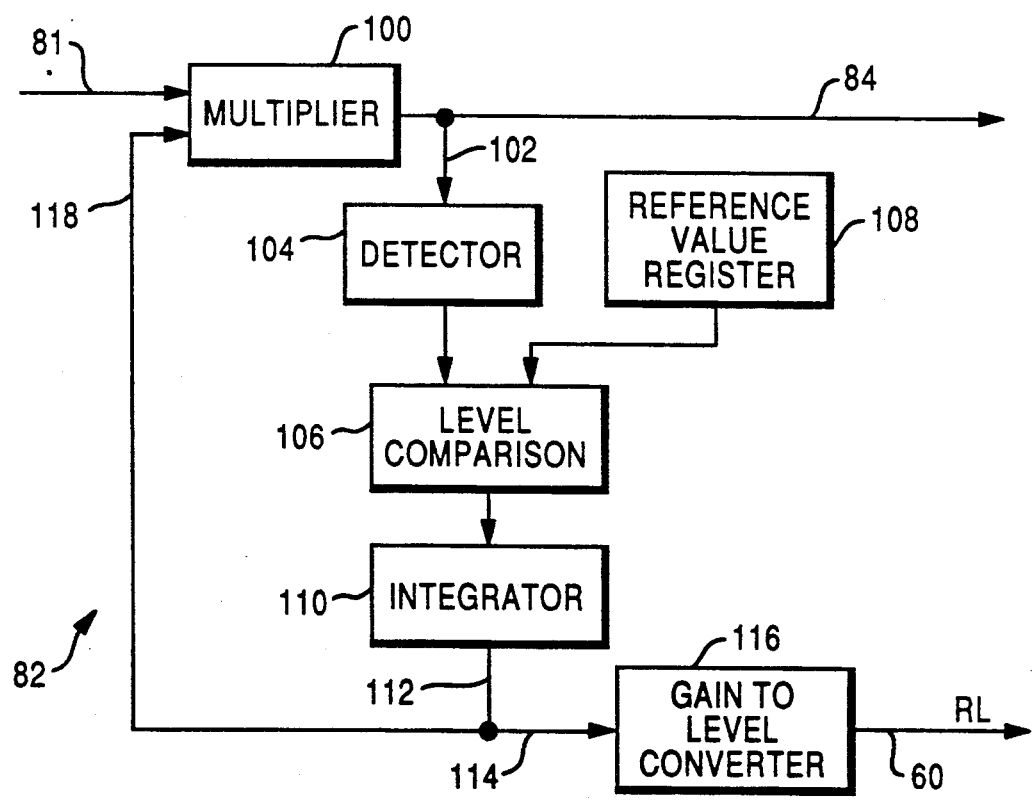
FIG. 5 is a block diagram of an automatic gain control circuit included in the receiver shown in FIG. 4.

Referring now to FIG. 5, there is shown a block diagram of the automatic gain control circuit 82 (FIG. 4). The baseband signal on the line 81 is applied to a multiplier circuit 100 having an output connected to the AGC circuit output line 84. The output of the multiplier circuit 100 is also connected over a line 102 to a detector circuit 104, which may be a peak detector circuit. The output of the peak detector circuit 104 is applied to a level comparison circuit 106, wherein a comparison is made with a reference value supplied by a reference value register 108 to provide a difference value which is integrated in an integrator 110. The result of the integration is the gain signal, which is provided on the output line 112 of the integrator 110. The line 112 is connected over a line 114 to a gain-to-level converter circuit 116 and over a line 118 to form a second input of the multiplier circuit 100. The gain signal on the line 114 is converted by the gain-to-level converter circuit 116, which functions as an inverter, to provide a receive level signal (RL) on the line 60, representing the receive signal level.

Figure 6:
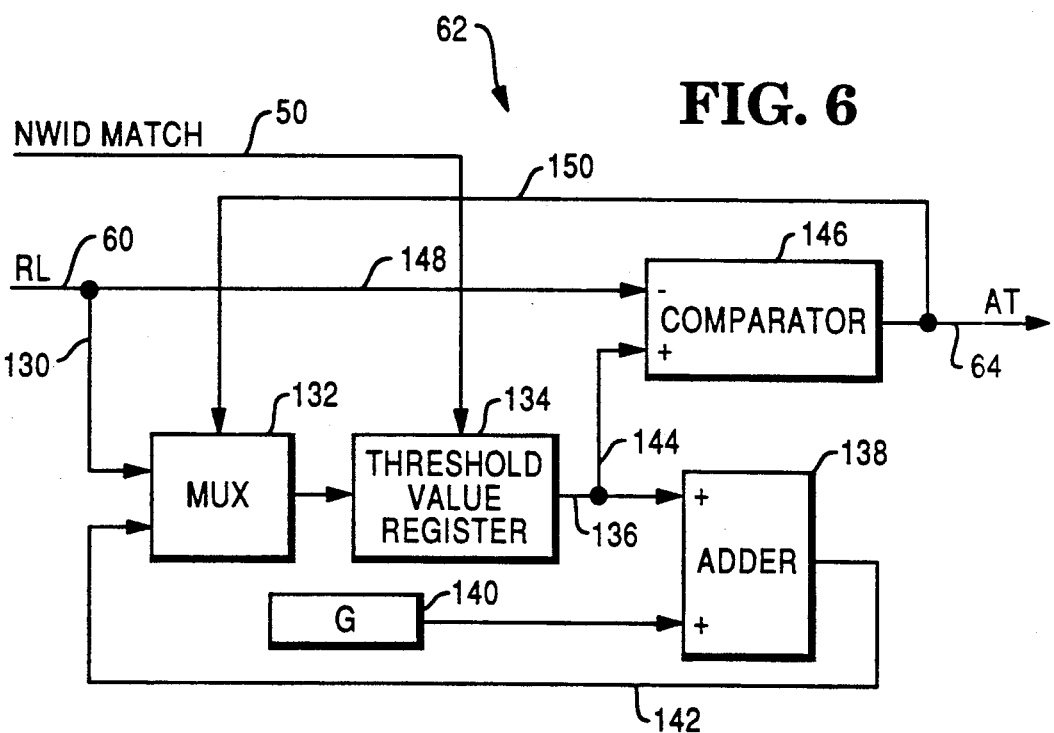
FIG. 6 is a block diagram of a threshold level circuit included in the LAN station shown in FIG. 3.

Referring now to FIG. 6, there is shown a block diagram of the threshold level circuit 62 (FIG. 3). The receive level signal (RL) on the line 60 is applied over a line 130 to a multiplexer (MUX) 132 having an output connected to a threshold value register 134 having an output line 136 connected to a first input of an adder 138, a second input of which receives a "grow" value G (to be explained), from a register 140. The output of the adder 138 is connected over a feedback line 142 to a second input of the multiplexer 132. The output line 136 of the threshold value register 134 is connected over a line 144 to a first input of a comparator 146, which has a second input connected over a line 148 to the line 60, which carries the receive level signal RL. The output of the comparator 146 is connected to the line 64 and provides an "above threshold" signal AT. The output of the comparator 146 is also connected over a line 150 to form the control input of the multiplexer 132.

Figure 7:
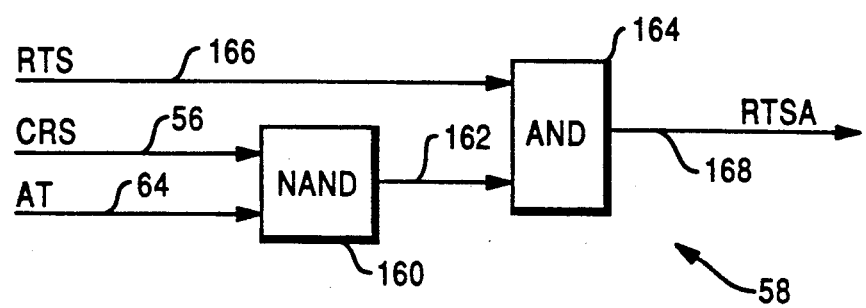
FIG. 7 is a block diagram of a transmitter control circuit included in the LAN station shown in FIG. 3.

Referring now to FIG. 7, there is shown a block diagram of the transmitter control circuit 58 (FIG. 3). The carrier sense signal (CRS) on the line 56 an the above threshold (AT) signal on the line 64 are applied to a NAND gate 160, having an output line 162 connected to a first input of an AND gate 164. A second input of the AND gate 164 receives a request-to-send (RTS) signal provided over the line 166 by the user logic circuit 54 (FIG. 3). The output of the AND gate 164, on the line 168, is a signal RTSA which is applied to the transmitter 46 (FIG. 3).

The operation of the above described circuitry will now be explained. When the user logic 54 desires to transmit a frame of data (FIG. 2) it issues a request-to-send (RTS) signal on the line 166 (FIGS. 3 and 7). If at this time, the receiver 42 is receiving a signal, the receive level (RL) thereof, on the line 60 (FIGS. 3 and 6) is applied to the comparator 146 wherein it is compared with the threshold value currently stored in the threshold value register 134. If the receive level (RL) is above the threshold value, the signal AT on the line 64 (FIGS. 3, 6, and 7), causes the gates 160, 164 to operate to prevent the signal RTSA from being generated on the line 168. Thus the transmitter 46 is inhibited from transmitting, such that transmission of the desired data frame is deferred. It will be appreciated that such deferment takes place regardless of whether the received frame NWID matches the NWID of the station 12 which receives the frame.

Figure 8:
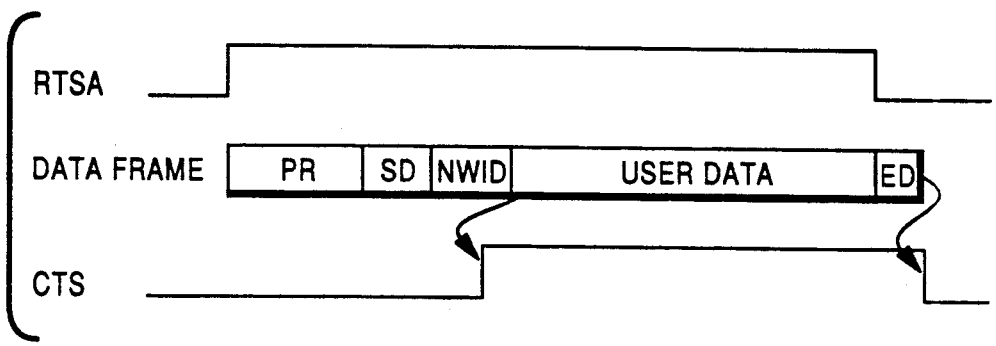
FIG. 8 shows waveforms illustrating a data frame transmission operation.

On the other hand, if the comparator 146 (FIG. 6) detects that the receive level signal RL is below the threshold value stored in the register 134, the gates 160 and 164 are operated to issue the signal RTSA on the line 168. Note that the comparator 146 will always determine the receive level signal RL as being either above or below the threshold value, since in practice random effects such a noise preclude precise equality. In response to this signal and referring to FIG. 8, the transmitter 46 causes the preamble PR, start delimiter SD, and NWID (FIG. 2) to be transmitted. Also, in sufficient time for the user logic 54 to issue the user data to be transmitted on the line 66, the transmitter 46 issues the clear-to-send signal CTS on the line 68. When all the user data has been issued by the user logic, the signal RTS is withdrawn, thereby causing the AND gate 164 (FIG. 7) to terminate the signal RTSA, which causes the transmitter 46 to transmit the frame end delimiter ED.

Figure 9:
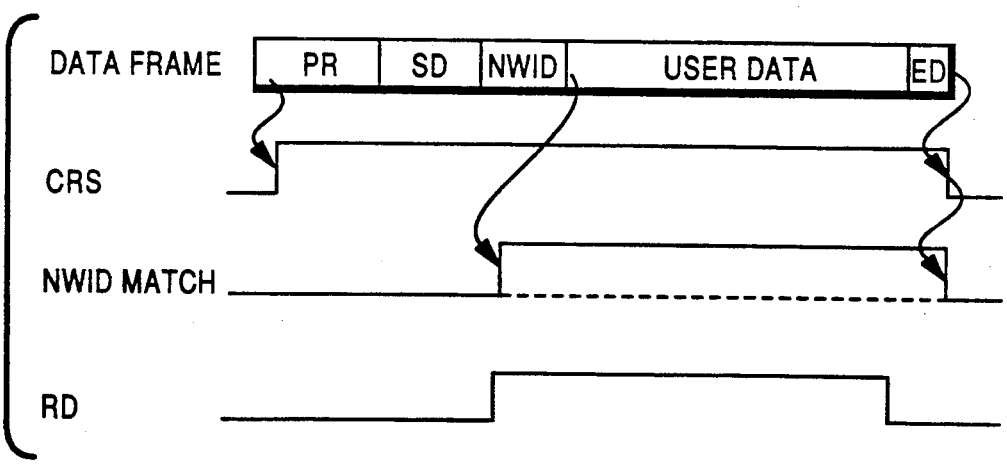
FIG. 9 shows waveforms illustrating a data frame reception operation.

The reception of a data frame will be described with reference to FIG. 9. As soon as the receiver 42 detects the data frame preamble PR, the signal CRS is provided on the line 56 by the carrier sense circuit 92 (FIG. 4). The NWID of the received frame is compared in the NWID detector circuit 90 with the station NWID and if there is a match, the NWID MATCH signal is generated on the line 50. Also, the carrier detect signal CRD (not shown in FIG. 9) is provided to the user logic circuit 54. This signal is utilized by the user logic 54 in processing the received data frame.

It will be appreciated that the utilization of a fixed, preset threshold value will provide an improvement in data throughput, as compared with a station wherein no such thresholding is utilized. An appropriate fixed threshold value can be determined, for example, by examining signal levels with the station being utilized in its installed location in the LAN. However, by dynamic updating of the threshold value as will now be explained, the threshold can adapt automatically to changes in its environmental conditions.

The updating of the threshold value in the register 134 (FIG. 6) will now be described. If a received data frame originates in the LAN 10 to which the station 12 belongs, the NWID MATCH signal on the line 50 enables the register 134 to be updated. If the receive level RL is determined by the comparator 146 to be above the threshold, the signal AT is provided and, via the control line 150, the multiplexer 132 is controlled to supply the output of the adder 138 to the register 134, thereby incrementing the threshold value by a "grow" value G from the register 140. It will be appreciated that this increase in the threshold value effectively causes the range in which transmission of data frames by the transmitter 46 is prevented, to be reduced. On the other hand, if the receive level RL is determined by the comparator 146 to be below the threshold value in the register 134, the multiplexer 132 is controlled to provide the signal RL to the register 134, thereby making the value in the register 134 equal to the current receive level.

It will be appreciated that the threshold value in the register 134 is adjusted only for data frames received from the network 10 to which the station 12 belongs (NWID MATCH) and that this dynamic adjustment adjusts the threshold level in such way as to adjust the coverage area boundary to the minimum receive level dynamically, thereby automatically allowing for movement of individual stations (where stations may be mobile) and compensating for signal fading or shadowing effects, to which radio LANs are subject.

Modifications of the described circuitry are possible. Thus, by including a counter in the threshold control circuit, it can be arranged that the threshold value register 134 is incremented by the value G only when the receive level RL has been determined to be higher than the threshold level for a predetermined member (e.g. 4), of successive received data frames having a matching NWID. In another modification, the value G may be zero, or the circuitry for adjusting the threshold value may be omitted. Thus, the threshold value is constant.

It should also be understood that the initial threshold value in the register 134, as well as the size of the "grow" value G in the register 140, are selectable by the user.

Figure 10:
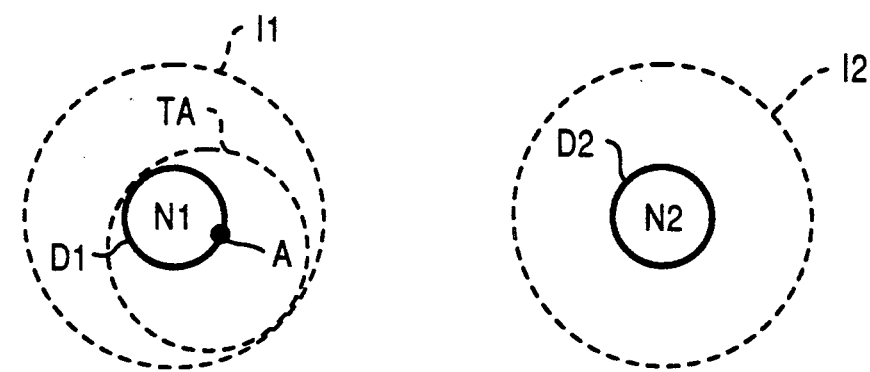
FIG. 10 illustrates two LANs disposed at widely separated locations.

Some practical examples of radio LAN configurations, wherein the LANs utilize a dynamically adjustable threshold control as described above will now be considered, with reference to various locational possibilities of such LANs. Referring first to FIG. 10, two LANs N1 and N2 are illustrated schematically. The maximum deployment area of radio LAN, N1 that is, the maximum area within which all stations thereof can communicate with each other is indicated by the area D1. Also the maximum area where the transmissions of any station at the edge of D1 can be received with the weakest possible receive level, is indicated by I1. By way of example, a station A has a coverage area indicated by TA. The areas D2 and I2 for the network N2 correspond to the areas D1 and I1 for the network N1. It will be appreciated that the networks N1 and N2 as shown in FIG. 1 each operate without any interference from the other.

Figure 11:
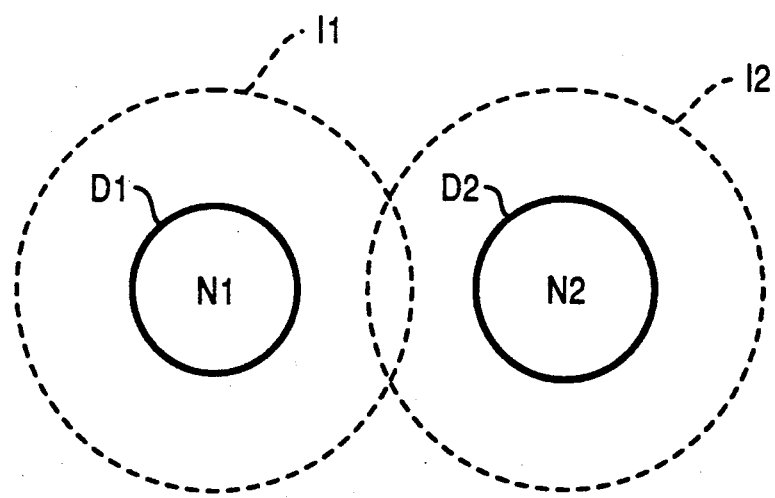
FIG. 11 illustrates two LANs disposed at less widely separated locations.

Turning now to FIG. 11, a situation is shown wherein the areas I1 and I2 overlap but neither reaches to D2 and D1 respectively; the situation is again that each network N1 and N2 operates without any interference from the other.

Figure 12:
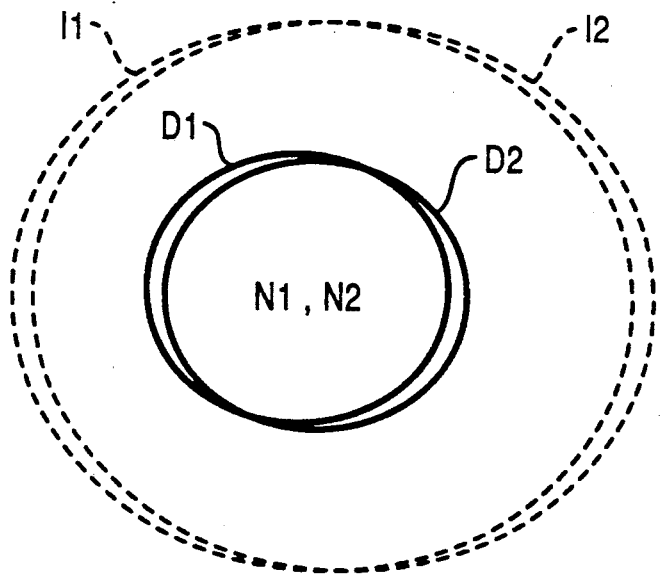
FIG. 12 illustrates two LANs disposed at substantially coincident locations.

Turning now to FIG. 12, the situation is illustrated wherein the networks N1 and N2 substantially coincide in location. In this situation, any member of one network will defer transmitting a frame until neither network has a transmitting station.

Figure 13:
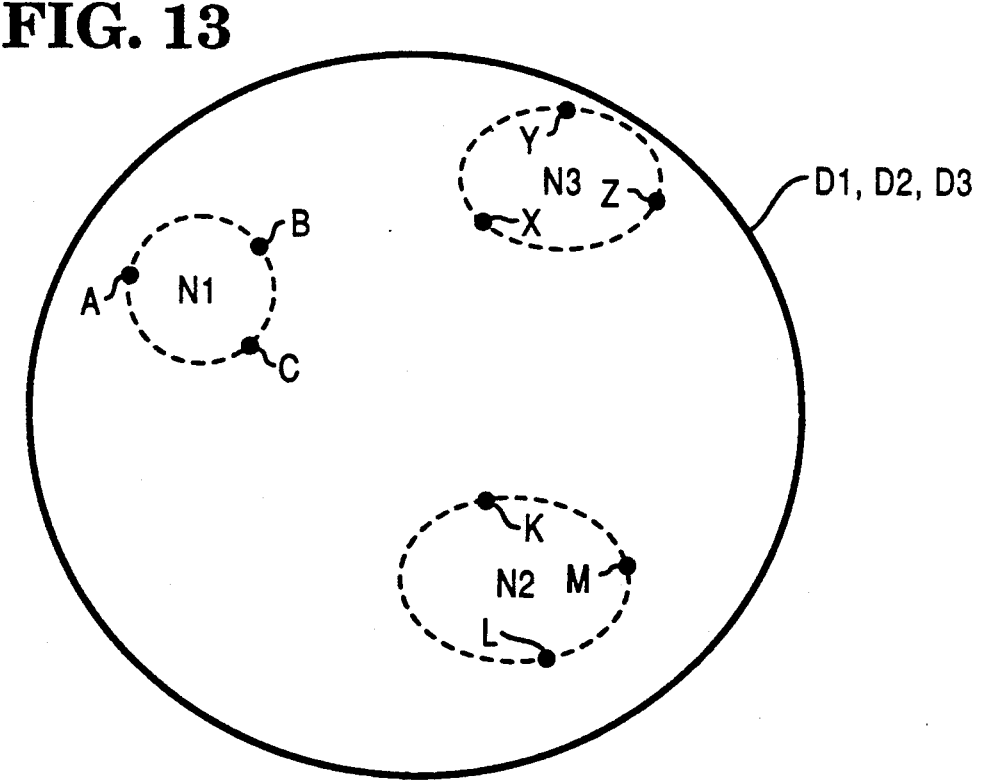
FIG. 13 illustrates three LANs widely spaced within a common reception area.

Referring now to FIG. 13, there are shown three networks N1, N2, and N3, all located within a common maximum deployment area D1, D2, and D3. Network N1 has typical stations A, B, and C. Network N2 has typical stations K, L, and M and network N3 has typical stations X, Y, and Z. Thus all stations can receive the transmissions of all other stations, as per FIG. 12. However, in FIG. 13, the actual networks each occupy a smaller physical area than the maximum deployment area D1, D2, and D3. As shown in FIG. 13, the intra-network distances (distances between stations of the same network) are less than the inter-network distances (distances between closest stations of different networks). Thus station-to-station signals within a network are always stronger than station-to-station signals between different networks. With the dynamically adjustable threshold mechanism described hereinabove, it will be appreciated that the dynamic threshold of each station within a network will be set so that all other stations outside the network are received with energy levels below the threshold. Thus, the utilization of a dynamically adjustable threshold enables multi-network usage of the radio transmission channel without throughout loss. Without the dynamic threshold feature, this would not be the case, since all stations, irrespective of which network they belonged to, would defer transmission due to the reception of any other station, regardless of which network the other station belonged to.

Figure 14:
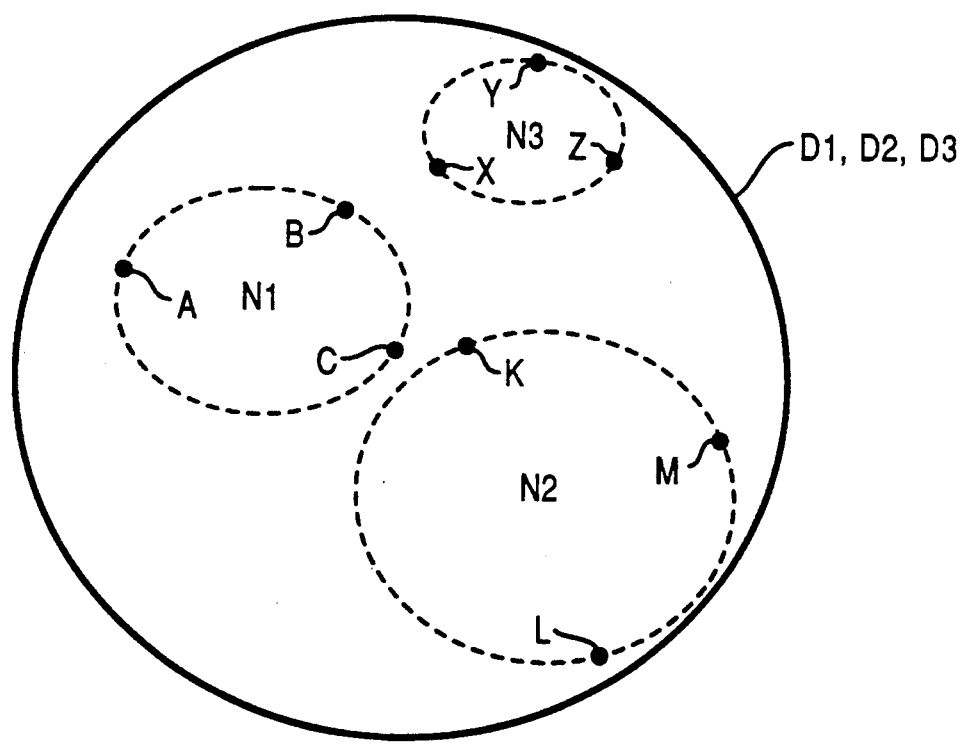
FIG. 14 illustrates three LANs less widely spaced within a common reception area.

Referring now to FIG. 14, there is shown a network disposition of three networks N1, N2, and N3, where the intra-network distances are not always smaller than the inter-network distances. For example, station C of network N1 is closer to station K of network N2 than it is to, station A of its own network N1. It will be appreciated that with the dynamic threshold feature described herein, station A of network N1 will set its threshold level to a value slightly less than the received energy level from station C, since station C is relatively remote from station A. Similarly, station C will set its energy level to a value slightly less than the received energy level from station A. Four cases will now be considered.

First, assume that station K of network N2 is transmitting a data frame when station A of network N1 desires to transmit a data frame. Since the received energy level of station K will be below the threshold value of station A, transmission by station A is permitted. Within network N1 stations which are closer to station A than to station K will receive station A's transmission. However, stations in network N1 which are closer to station K than to station A will probably not receive station A's transmission since the received energy level of station K at such stations is greater than the received energy level of station A. Thus there is a possible frame loss for some stations in network N1. Nevertheless, because of station A's remoteness there is no frame loss in network N2.

Secondly, assume that station M of network N2 is transmitting when station A of network N1 desires to transmit. Since the received energy level of station M will be below the threshold value of station A, transmission by station A is permitted. It is likely that all stations of network N1 will receive the data frame transmitted by station A. It is also likely that all stations of network N2 continue to receive the transmission of station M, particularly since the stations of network N2 will have set their parameters, which may include a selected antenna where stations have more than one antenna, in accordance with the transmission by station M. Thus, it is likely that there will be no loss of frames in either network N1 or N2.

Thirdly, assume that station K of network N2 is transmitting when station C of network N1 desires to transmit. It is likely that the received energy level of station K will be higher than the threshold value of station C. Therefore, station C will defer its transmission. In this case there is again no frame loss.

Finally, assume that station M of network N2 is transmitting when station C of network N1 desired to transmit. Assuming that the received energy level of station M at station C is below the threshold level of station C, then station C is permitted to transmit. It is likely that all stations of network N1 will receive the transmission of station C. However, some stations of network N2 will lose the transmission of station M.

Summarizing with the network disposition shown in FIG. 14, the utilization of a dynamically adjustable threshold permits multi-network usage of the radio transmission channel, but at the expense of a possible frame loss in some situations In general, considering the disposition of both FIGS. 13 and 14, it will be appreciated that within a single deployment area (D1, D2, and D3) a plurality of networks can share the radio transmitted channel with a utilization of the channel greater than if no threshold transmission control were employed.

To summarize this invention in claim-like language, it relates to a local area network station for receiving signals on a wireless radio transmission channel comprising:

a receiver means for receiving signals;
a transmitter means for transmitting signals;
said receiver means comprising:
receive level determination means (82) to provide a receive signal level (RL) representing a signal level received over said transmission channel;
threshold level circuit means to provide a level indicator signal (AT) in dependence upon a relative value of said receive signal level (RL) and a threshold level value; and transmitter control means to control the operation of said transmitter means in dependence upon said level indicator signal (AT).

The local area network station also includes:
user logic means to generate a request-to-send signal (RTS) if it is desired to send a data frame;
said transmitter control means being effective to provide a transmission enabling signal (RTSA) if said request-to-send signal (TRS) is generated and said level indicator signal (AT) indicates that the value of said receive level signal (RL) is below said threshold level value.

The threshold level circuit means (62) adjusts said threshold level value dynamically.

Said station is one station of a local area network of stations in which said data signals are transmitted in the form of data frames containing network identification data (NWID) identifying said network to which said station belongs, and in which said threshold level is adjusted only when a data frame is received which includes network identification data matching network identification data associated with said local area network station.

The threshold level circuit means (62) is effective:
to increment said threshold level value by a predetermined value (G) if said receive level signal (RL) is greater than said threshold level value; and
to replace said threshold level value by the value of said receive level signal (RL) if said receive level signal (RL) is less than said threshold level value.

The threshold level circuit means (62) includes:
a threshold value register (134) to store said threshold level value and also having an output; and
comparison means (146) having first and second inputs thereto and an output therefrom;
said first input of said comparison means being coupled to said output of said threshold value register;
said second input of said comparison means receiving said receive level signal (RL); and
said output of said comparison means providing said level indicator signal (AT).

The threshold level means (62) also includes;
an adder circuit (138); and
a multiplexer circuit (132);
said adder circuit (138) having:
a first input coupled to said output of said threshold value register;
a second input to receive said predetermined value (G); and
an output;
said multiplexer circuit (132) having:
an input adapter to receive said receive level signal (RL); and
a control input coupled to said input of said comparison means (146).

The receive level determination means (82) includes an automatic gain control circuit providing a gain signal and being effective to set a value for said receive level signal which is determined by said gain signal. The automatic gain control circuit includes a conversion means to invert said gain signal to provide said receive level signal (RL).

While the form of the invention shown and described herein is admirably adapted to fulfill the object primarily stated, it is to be understood that it is not intended to confine the invention to the form or embodiment disclosed herein, for it is susceptible of embodiment in various other forms within the scope of the appended claims.

What is claimed is:

1. A local area network station for receiving and transmitting data on a single wireless transmission channel comprising:
    a receiver means for receiving data on said transmission channel;
    a transmitter means for transmitting data on said transmission channel;
    said receiver means comprising:
    receive level determination means to provide a receive signal level representing a signal level received over said transmission channel;
    threshold level circuit means to provide a level indicator signal in dependence upon a relative value of said receive signal level and a threshold level value; and
    dynamic transmitter control means to control the operation of said transmitter means to transmit said data on said transmission channel when said level indicator signal indicates that the value of said receive level signal is below said threshold level value.

2. A local area network station for receiving signals on a wireless transmission channel comprising:
    a receiver means for receiving signals;
    a transmitter means for transmitting signals;
    said receiver means comprising:
    receive level determination means to provide a receive signal level representing a signal level received over said transmission channel;
    threshold level circuit means to provide a level indicator signal in dependence upon a relative value of said receive signal level and a threshold level value; and
    transmitter control means to control the operation of said transmitter means in dependence upon said level indicator signal;
    said local area network station further comprising:
    user logic means to generate a request-to-send signal if it is desired to send a data frame;
    said transmitter control means being effective to provide a transmission enabling signal if said frequent-to-send signal is generated and said level indicator signal indicates that the value of said receive level signal is below said threshold level value.

3. The local area network station as claimed in claim 2 in which said threshold level circuit means adjusts said threshold level value dynamically.

4. The local area network station as claimed in claim 3 in which said station is one station of a local area network of stations, and in which said data signals are transmitted in the form of data frames containing network identification data identifying said network to which said station belongs, and in which said threshold level is adjusted only when a data frame is received which includes network identification data matching network identification data associated with said local area network station.

5. The local area network station as claimed in claim 4 in which said threshold level circuit means is effective:
    to increment said threshold level value by a predetermined value if said receive level signal is greater than said threshold level value; and
    to replace said threshold level value by the value of said receive level signal if said receive level signal is less than said threshold level value.

6. The local area network station as claimed in claim 5 in which said threshold level circuit means includes:
    a threshold value register to store said threshold level value and also having an output; and
    comparison means having first and second inputs thereto and an output therefrom;
    said first input of said comparison being coupled to said output of said threshold value register;
    said second input of said comparison means receiving said receive level signal; and
    said output of said comparison means providing said level indicator signal.

7. The local area network station as claimed in claim 6 in which said threshold level means includes;
    an adder circuit; and
    a multiplexer circuit;
    said adder circuit having:
    a first input coupled to said output of said threshold value register;
    a second input to receive said predetermined value; and
    an output;
    said multiplexer circuit having:
    an input adapter to receive said receive level signal; and
    a control input coupled to said input of said comparison means.

8. The local area network station as claimed in claim 7 in which said receive level determination means includes an automatic gain control circuit providing a gain signal and being effective to set a value for said receive level signal which is determined by said gain signal.

9. The local area network station as claimed in claim 8 in which said automatic gain control circuit includes a conversion means to invert said gain signal to provide said receive level signal.

10. A method of operating a local area network station on a single wireless transmission channel, wherein said station includes receiver means and transmitter means, including,, the steps of:
    (a) determining a receive signal level representing the signal level received by said receiver means over said transmission channel;
    (b) determining the relative value of said receive signal level and threshold level; and
    (c) controlling the operation of said transmitter means in dependence on said relative value;
    said controlling step being effected by inhibiting the operation of said transmitter means when said receive signal level is above said threshold level.

11. The method as claimed in claim 10 in which said determining step is effected dynamically for said threshold level.

* * * * *

UNITED STATES PATENT AND TRADEMARK OFFICE
CERTIFICATE OF CORRECTION

PATENT NO. : 5,220,564
DATED : June 15, 1993
INVENTOR(S) : Bruce T. Tuch et al.

It is certified that error appears in the above-identified patent and that said Letters Patent is hereby corrected as shown below:

Column 10, line 16, after "comparison" insert --means--.

Signed and Sealed this

Fifth Day of April, 1994

BRUCE LEHMAN

*Attest:*

*Attesting Officer*  Commissioner of Patents and Trademarks